US012565404B2

(12) United States Patent
Liu et al.

(10) Patent No.: US 12,565,404 B2
(45) Date of Patent: Mar. 3, 2026

(54) CONSTRUCTION LIFTING DEVICE AND LEAPING METHODS FOR CONSTRUCTION LIFTING DEVICES

(71) Applicant: Otis Elevator Company, Farmington, CT (US)

(72) Inventors: Wenxiang Liu, Hangzhou (CN); Jianfeng Wu, Hangzhou (CN); Chenfeng Shi, Hangzhou (CN); Ming Chen, Hangzhou (CN); Jiajun Zhu, Hangzhou (CN); Linfeng Song, Hangzhou (CN)

(73) Assignee: OTIS ELEVATOR COMPANY, Farmington, CT (US)

( * ) Notice: Subject to any disclaimer, the term of this patent is extended or adjusted under 35 U.S.C. 154(b) by 0 days.

(21) Appl. No.: 18/828,551

(22) Filed: Sep. 9, 2024

(65) Prior Publication Data

US 2025/0083928 A1 Mar. 13, 2025

(30) Foreign Application Priority Data

Sep. 11, 2023 (CN) ......................... 202311166968.7

(51) Int. Cl.
*B66B 19/00* (2006.01)
*B66B 19/02* (2006.01)

(52) U.S. Cl.
CPC ............ *B66B 19/00* (2013.01); *B66B 19/002* (2013.01); *B66B 19/02* (2013.01)

(58) Field of Classification Search
CPC .... B66B 9/00; B66B 5/04; B66B 7/06; B66B 11/00; B66B 11/008; B66B 11/0075; B66B 17/34
See application file for complete search history.

(56) References Cited

U.S. PATENT DOCUMENTS

| | | | | |
|---|---|---|---|---|
| 9,592,997 | B2 * | 3/2017 | Mertala | B66B 19/002 |
| 9,890,019 | B2 * | 2/2018 | Kere | E04G 3/28 |
| 11,053,098 | B2 * | 7/2021 | Christen | B66B 19/00 |
| 11,377,324 | B2 * | 7/2022 | Kim | B66B 11/0045 |
| 2018/0273349 | A1 * | 9/2018 | Weibel | B66B 7/024 |

(Continued)

FOREIGN PATENT DOCUMENTS

| | | | | |
|---|---|---|---|---|
| CN | 200964317 Y | * 10/2007 | | |
| CN | 203173644 U | * 9/2013 | | |
| CN | 110092264 A | * 8/2019 | | B66B 9/00 |

(Continued)

OTHER PUBLICATIONS

CN110817661; H. Zhang; An Elevator Used When Constructing The System; English Machine Translation; Feb. 21, 2021 (Year: 2021).*

(Continued)

*Primary Examiner* — Bayan Salone
(74) *Attorney, Agent, or Firm* — CANTOR COLBURN LLP

(57) ABSTRACT

A construction lifting device and a leaping method for a construction lifting device. The leaping method includes erecting a top crossbeam above a target floor in a shaft; connecting a host platform of the construction lifting device to the top crossbeam by a drive device; raising a car of the construction lifting device close to the host platform and fixedly connecting the car to the host platform; and activating the drive device to lift the host platform to the target floor.

17 Claims, 19 Drawing Sheets

(56) References Cited

U.S. PATENT DOCUMENTS

| | | | | |
|---|---|---|---|---|
| 2019/0276277 | A1* | 9/2019 | Christen | B66B 19/00 |
| 2020/0062549 | A1* | 2/2020 | Kim | B66B 19/00 |

FOREIGN PATENT DOCUMENTS

| | | | | | |
|---|---|---|---|---|---|
| CN | 110817661 | A | * | 2/2020 | B66B 11/043 |
| CN | 210563332 | U | * | 5/2020 | |
| CN | 111699149 | A | | 9/2020 | |
| CN | 111827645 | A | * | 10/2020 | E04G 5/003 |
| CN | 211998550 | U | * | 11/2020 | |
| CN | 212478503 | U | | 2/2021 | |
| CN | 112672970 | A | * | 4/2021 | B66B 19/00 |
| CN | 112962944 | A | * | 6/2021 | E04G 1/18 |
| CN | 111699149 | B | * | 8/2021 | B66B 7/00 |
| CN | 214269987 | U | * | 9/2021 | |
| CN | 214734024 | U | * | 11/2021 | |
| CN | 214942442 | U | * | 11/2021 | |
| CN | 215248971 | U | * | 12/2021 | |
| CN | 216583666 | U | * | 5/2022 | |
| CN | 115448127 | A | * | 12/2022 | E04F 17/005 |
| CN | 218202073 | U | * | 1/2023 | |
| CN | 218560778 | U | * | 3/2023 | |
| DE | 69107509 | T2 | | 3/1995 | |
| EP | 2993153 | A1 | | 3/2016 | |
| EP | 3548413 | B1 | * | 1/2021 | B66B 19/00 |
| EP | 2993153 | B1 | * | 1/2022 | B66B 19/002 |
| EP | 3847121 | B1 | * | 10/2022 | B66B 19/00 |
| TW | M288299 | U | * | 3/2006 | |
| WO | WO-2015003965 | A1 | * | 1/2015 | B66B 19/002 |
| WO | WO-2022069316 | A1 | * | 4/2022 | B66B 19/002 |
| WO | WO-2023160817 | A1 | * | 8/2023 | E04G 3/32 |

OTHER PUBLICATIONS

European Search Report for Application No. 24198742.9, Issued Feb. 13, 2025, 11 Pages.

* cited by examiner

CONSTRUCTION LIFTING DEVICE AND LEAPING METHODS FOR CONSTRUCTION LIFTING DEVICES

FOREIGN PRIORITY

This application claims priority to Chinese Patent Application No. 202311166968.7, filed Sep. 11, 2023, and all the benefits accruing therefrom under 35 U.S.C. § 119, the contents of which in its entirety are herein incorporated by reference.

TECHNICAL FIELD OF INVENTION

The present invention relates to the field of construction lifting devices, in particular to a construction lifting device and a leaping method thereof.

BACKGROUND OF THE INVENTION

Construction lifting devices are used for transporting building materials and construction workers during the construction process. As the height of a building gradually increases, the construction lifting devices also need to leap multiple times to raise its operating height, transporting goods and workers to higher floors, such as the floor under construction. The existing construction lifting devices are usually installed outside the buildings, with their operations being affected by factors such as climate in the outside world.

SUMMARY OF THE INVENTION

The object of the present application is to solve or at least alleviate the problems existing in the prior art.

According to one aspect, a leaping method for a construction lifting device is provided, comprising: erecting a top crossbeam above a target floor in a shaft; connecting a host platform of the construction lifting device to the top crossbeam by a drive device; raising a car of the construction lifting device close to the host platform and fixedly connecting the car and the host platform; and activating the drive device to lift the host platform to the target floor.

Optionally, the step of connecting the host platform to the top crossbeam by a drive device include: connecting the host platform to the top crossbeam using fixed pulleys and a climbing rope, and connecting a rope climber to the host platform and threading the climbing rope through the rope climber.

Optionally, the leaping method further includes: removing the connection between the host platform and the current floor before activating the drive device, and connecting the host platform to the target floor after the host platform is lifted to the target floor.

Optionally, the step of fixedly connecting the car to the host platform include: connecting the car to the host platform using a plurality of rigid connecting rods; and connecting the car to the host platform using flexible ropes.

Optionally, the leaping method further includes: before erecting the top crossbeam, lifting the top crossbeam to an installation position using a winch arranged on the target floor, a transition pulley installed on the shaft wall, and a rope connecting the winch and the transition pulley.

Optionally, the leaping method further includes: after erecting the top crossbeam, lifting car guide rails through the winch and the top crossbeam, and installing the car guide rails to extend the car guide rails on side walls on both sides of the shaft to the target floor.

Optionally, the step of erecting a top crossbeam above the target floor in the shaft includes: horizontally arranging the top crossbeam across the shaft between front and rear walls of the shaft.

Optionally, the leaping method further includes: extending a compensation chain connected between the bottom of the counterweight and that of the car and extending a driving rope connected between the host platform, the counterweight, and the car, before activating the drive device, so that the counterweight remains at the bottom of the shaft during the leaping process of the host platform.

Optionally, the leaping method includes: arranging a compensation chain quick release buckle at the bottom of the counterweight; and extending the length of the compensation chain through the quick release buckle at the bottom of the shaft after the car rises close to the host platform.

Optionally, the method further includes: lifting the driving rope spool through the winch and the top crossbeam and arranging it outside the door opening on the lower floor next to the target floor, before the step of extending the driving rope.

Optionally, the host platform is provided with a traction machine, and at least one end of the driving rope is connected to the host platform through an adjustable rope head component, where the step of extending the driving rope include: releasing the driving rope through the adjustable rope head component.

Optionally, the fixed end of the driving rope is connected to the host platform through a first rope head component, and the driving rope, starting from the fixed end, is sequentially wound around a counterweight fixed pulley at the top of the counterweight, the traction machine on the host platform, a car fixed pulley at the top of the car, and a second rope head component on the host platform before being wound onto the driving rope spool, where the second rope head component is an adjustable rope head component.

Optionally, the second rope head component includes: a rope head body connected to the host platform and comprising an outer wall, an internal cavity defined by the outer wall, a first port and a second port at both ends of the internal cavity, where the size of the internal cavity decreases gradually from the first port to the second port, a wedge block having a shape that matches the internal cavity and capable of being inserted into the internal cavity from the first port, causing the driving rope to be clamped between the wedge block and the outer wall of the rope head body, wherein, the step of extending the driving rope include: removing the wedge block, taking out the driving rope from the second rope head component, and releasing the driving rope from the driving rope spool.

Optionally, the leaping method further includes arranging a climbing rope as follows: winding the free end of the climbing rope to a climbing rope spool, then threading through a rope climber connected to a front first position of the host platform, extending upwards to wrap around a second crossbeam fixed pulley on the top crossbeam, extending downwards to wrap around a second platform fixed pulley connected to a front second position of the host platform, extending horizontally to wrap around a first platform fixed pulley connected to a rear second position of the host platform, extending upwards to wrap around a first crossbeam fixed pulley on the top crossbeam, and finally extending downwards to fix to the host platform through a rope hook at a rear first position.

Optionally, the leaping method further includes: extending a speed governor rope between a speed governor and a safety gear lifting mechanism, and lifting and installing the speed governor on the car guide rails of the target floor.

Optionally, the speed governor is connected with the safety gear lifting mechanism that is connected to the car through a speed governor rope, wherein the speed governor rope includes a first section connected to the speed governor and a second section connected to the safety gear lifting mechanism, where the first section and the second section are each wound into a U-shaped shape through a wire clamp and connected through a ring buckle, and the first section includes a redundant segment retained through the wire clamp. The leaping method further includes: extending the speed governor rope by adjusting the position of the wire clamp to release the redundant segment.

Optionally, the step of removing the connection between the host platform and the current floor include retracting front and rear legs of the host platform, and the step of connecting the host platform to the target floor include unfolding the front and rear legs.

According to another aspect, a construction lifting device is also provided, which includes: a host platform with a traction machine and a plurality of installation positions provided thereon; a car and a counterweight connected to the traction machine on the host platform through a driving rope, where a compensation chain is connected between the bottom of the car and that of the counterweight; wherein, the plurality of installation positions are configured with hanging rings for connecting to rope hooks, fixed pulleys, or a rope climber.

Optionally, in an embodiment of the construction lifting device, the plurality of installation positions include a front first position, a front second position, and a rear first position and a rear second position.

Optionally, in an embodiment of the construction lifting device, the front first position, the front second position, the rear first position and the rear second position are located at four corners of the host platform and at four vertexes of the rectangle.

Optionally, in an embodiment of the construction lifting device, a rope hook is connected at the rear first position, a first platform fixed pulley is connected at the rear second position, a second platform fixed pulley is connected at the front second position, and the rope climber is connected at the front first position.

Optionally, in an embodiment of the construction lifting device, the host platform comprises a front portion close to the front wall and a rear portion close to the rear wall, the front portion and the rear portion of the host platform are provided with front and rear legs telescopic in the front and rear directions respectively Optionally, in an embodiment of the construction lifting device, a compensation chain quick release buckle is arranged at the bottom of the counterweight.

Optionally, in an embodiment of the construction lifting device, a traction machine is provided on the host platform, and at least one end of the driving rope is connected to the host platform through an adjustable rope head component.

Optionally, in an embodiment of the construction lifting device, a fixed end of the driving rope is connected to the host platform through a first rope head component, and is sequentially wound around, starting from the fixed end, a counterweight fixed pulley at the top of the counterweight, the traction machine, a car fixed pulley at the top of the car, and the second rope head component on the host platform before being wound onto the driving rope spool.

Optionally, in an embodiment of the construction lifting device, the second rope head component is an adjustable rope head component.

Optionally, in an embodiment of the construction lifting device, the second rope head component includes: a rope head body connected to the host platform and comprising an outer wall, an internal cavity defined by the outer wall, and a first port and a second port at both ends of the internal cavity, where the size of the internal cavity decreases gradually from the first port to the second port, and a wedge block having a shape that matches the internal cavity and capable of inserting into the internal cavity from the first port, so that the driving rope is clamped between the wedge block and the outer wall of the rope head body.

Optionally, in an embodiment of the construction lifting device, the construction lifting device includes a speed governor installed on the car guide rails and a safety gear lifting mechanism connected to the car, where the speed governor is connected to the safety gear lifting mechanism through a speed governor rope.

Optionally, in an embodiment of the construction lifting device, the speed governor rope includes a first section connected to the speed governor and a second section connected to the safety gear lifting mechanism, where the first section and the second sections are each wound into a U-shaped shape through a wire clamp and connected through a ring buckle.

Optionally, in an embodiment of the construction lifting device, the first section includes a redundant segment retained through the wire clamp.

The method according to the present invention can be executed in the shaft of the building to improve the stability of operation.

BRIEF DESCRIPTION OF THE DRAWINGS

With reference to the accompanying drawings, the disclosure of the present application will become easier to understand. Those skilled in the art would easily understand that these drawings are for the purpose of illustration, and are not intended to limit the protection scope of the present application. In addition, in the figures, similar numerals are used to denote similar components, where.

DETAILED DESCRIPTION OF THE INVENTION

Figure 1A:
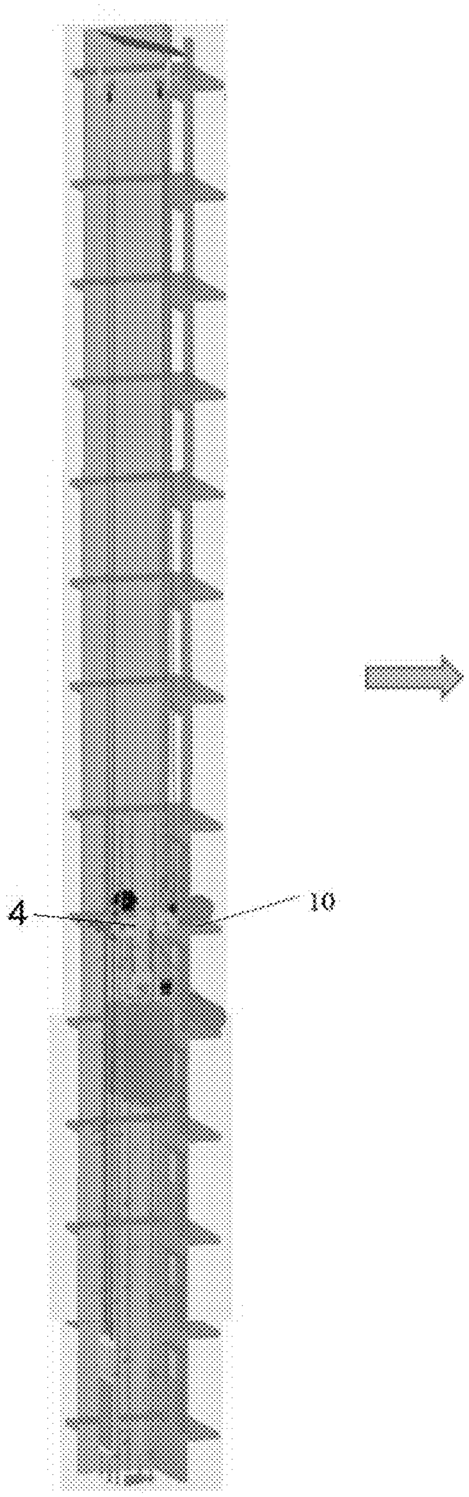
FIGS. 1*a* and 1*b* show a comparison of the positions of the construction lifting device inside the shaft before and after it is lifted.
Figure 1B:
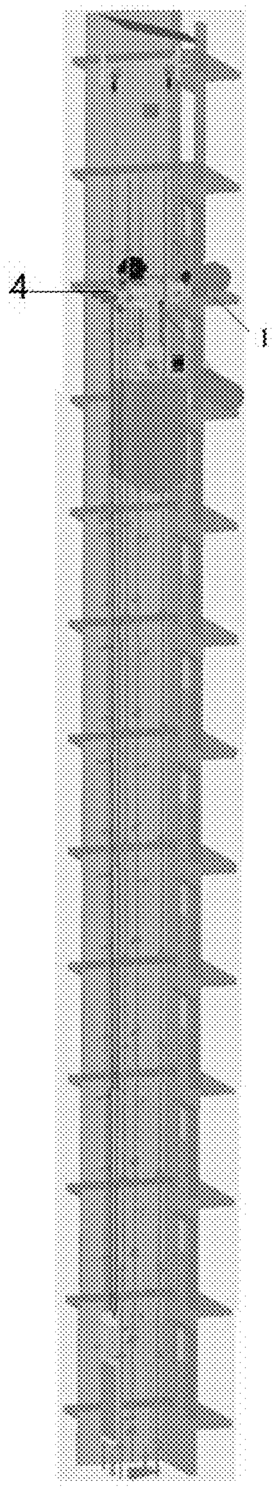

The present invention provides a leaping method for a construction lifting device. As most easily seen in FIGS. 1*a* and 1*b*, the method aims to lift a host platform 4 of the construction lifting device from a current floor 10 to a target floor 1, thus expanding the operating range of the car of the construction lifting device. During the construction process, the construction lifting device can leap several times in this manner as the building is being built to greater heights, thereby transporting components and workers closer to the floor under construction, facilitating the transportation of building materials and workers, as well as the construction of the building. It should be appreciated that the construction lifting device according to the present invention is installed in the shaft inside the building rather than outside the building, and the leaping process is also carried out in the shaft.

The leaping method for a construction lifting device includes: erecting a top crossbeam above a target floor in a shaft; connecting a host platform of the construction lifting device to the top crossbeam by a drive device; raising a car of the construction lifting device close to the host platform, and securing the car to the host platform; and activating the drive device to lift the host platform to the target floor.

Figure 2:
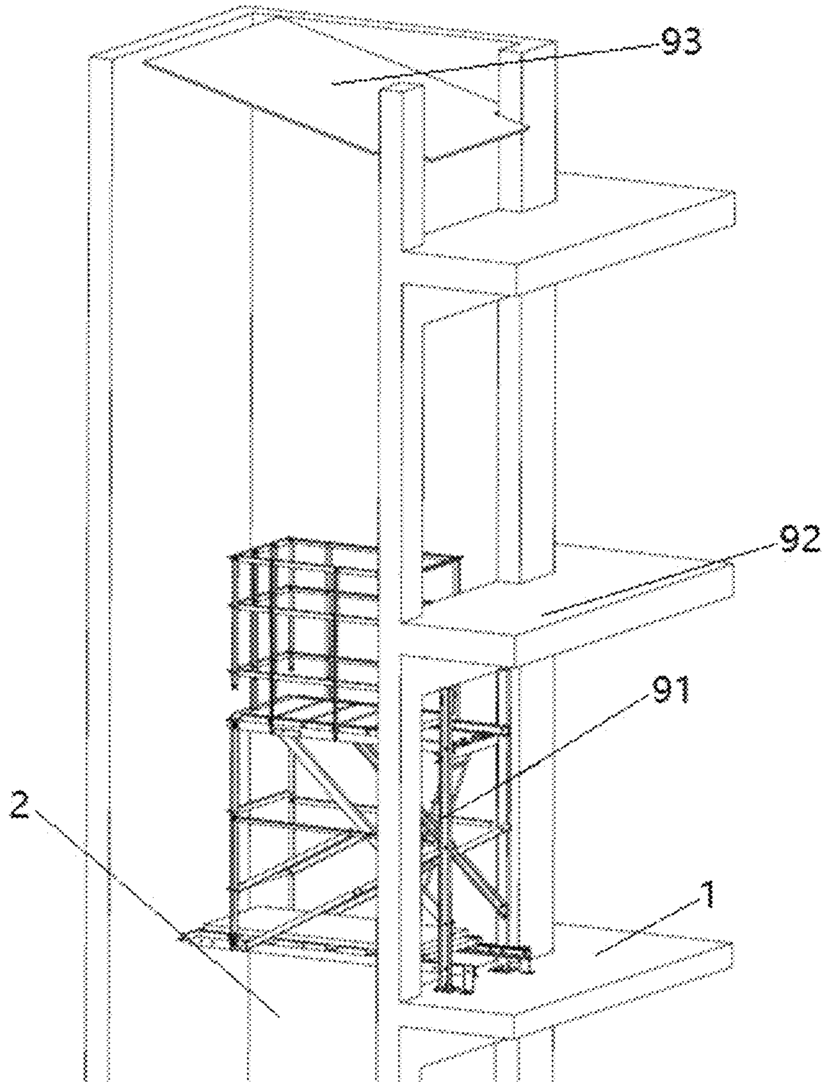
FIG. 2 shows the situation of the shaft where the construction lifting device is arranged and the target floor.

First, the step for erecting the top crossbeam is described with reference to FIGS. 2 to 4. Firstly, the top of a shaft 2 can be closed by a baffle 93 to avoid external environmental impact. Then, a top platform 91, which would facilitate operations on target floor, can be built on the target floor 1. The shaft 2 includes a hall door opening, which is arranged at a front wall 22 of the shaft. Generally, the shaft further includes a rear wall 21 opposite the front wall 22 and a pair of side walls between the front wall 22 and the rear wall 21. In some embodiments, a winch 11 can be installed outside the hall door opening of the target floor 1, where the winch 11 is fixed to the floor of the target floor 1 through, for example, a plurality of bolts. In addition, a transition pulley 85 is installed on the rear wall 21 of the shaft above the target floor. Subsequently, a top crossbeam 3 can be lifted to the installation position using a rope connected to the winch 11 and passing through the transition pulley 85. Alternatively, the top crossbeam 3 can also be lifted and installed in place through other means. In some embodiments, the top crossbeam 3 is horizontally arranged across the shaft between the front wall 22 and the rear wall 21 of the shaft. In alternative embodiments, the top crossbeam 3 may have other suitable orientations, such as being installed between two side walls, or, the top crossbeam 3 may be fixed at one end to the shaft wall and the other end to the hall door opening.

Figure 3:
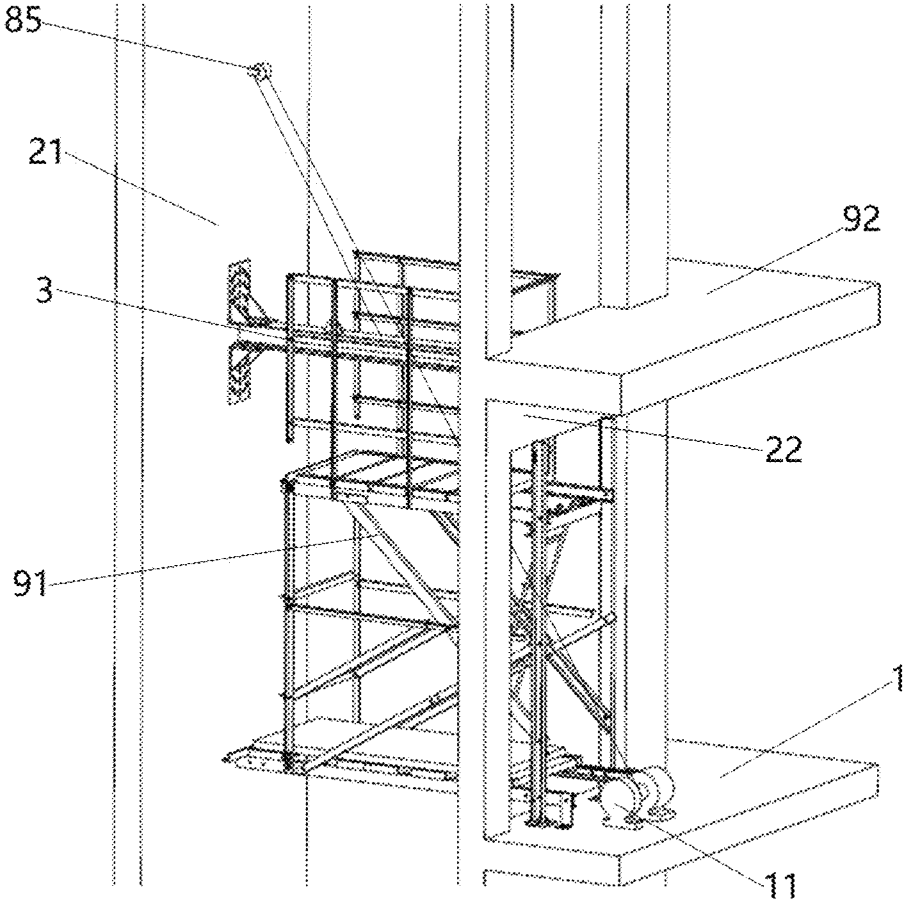
FIG. 3 shows the top crossbeam erected in the shaft of FIG. 1.
Figure 4:
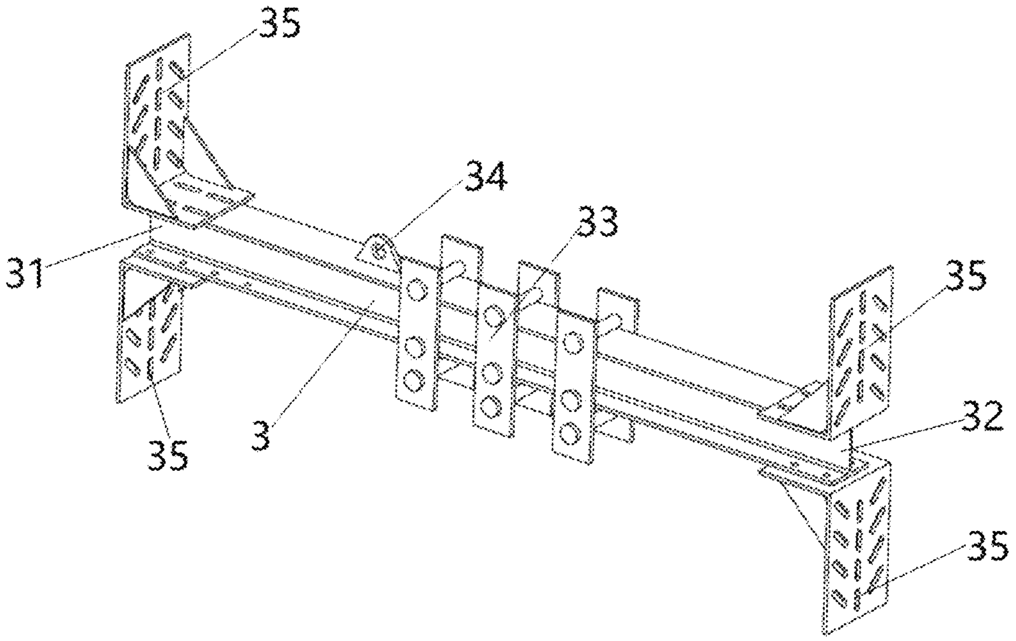
FIG. 4 shows a perspective view of an exemplary top crossbeam.

As shown in FIGS. 3 and 4, in some embodiments, a first end 32 of the top crossbeam 3 is connected to the front wall 22 at a position above the hall door of target floor 1, and a second end 31 of the top crossbeam is connected to the corresponding position of the rear wall 21. The first end 32 and second end 31 of the top crossbeam 3 are connected to the front or rear walls of the shaft respectively through a pair of horn brackets 35. The horn brackets 35 can be arranged above or below the top crossbeam 3, or arranged both above and below the top crossbeam 3. In addition, the top crossbeam 3 also includes a connection point 34 for the lifting of itself, a connection point 33 for lifting other components, guide rails for arranging pulleys, and other structures. In the illustrated embodiments, the first end 32 of the top crossbeam 3 is arranged on the front wall at the top of the hall door on the target floor 1, in alternative embodiments, however, the first end 32 of the top crossbeam 3 can also be directly installed on the floor outside the hall door opening on the upper floor 92 of the target floor. Similarly, the first end 32 of the top crossbeam 3 can also be installed on the floor outside the hall door opening on the upper floor 92 through two horn brackets 35.

Figure 5:
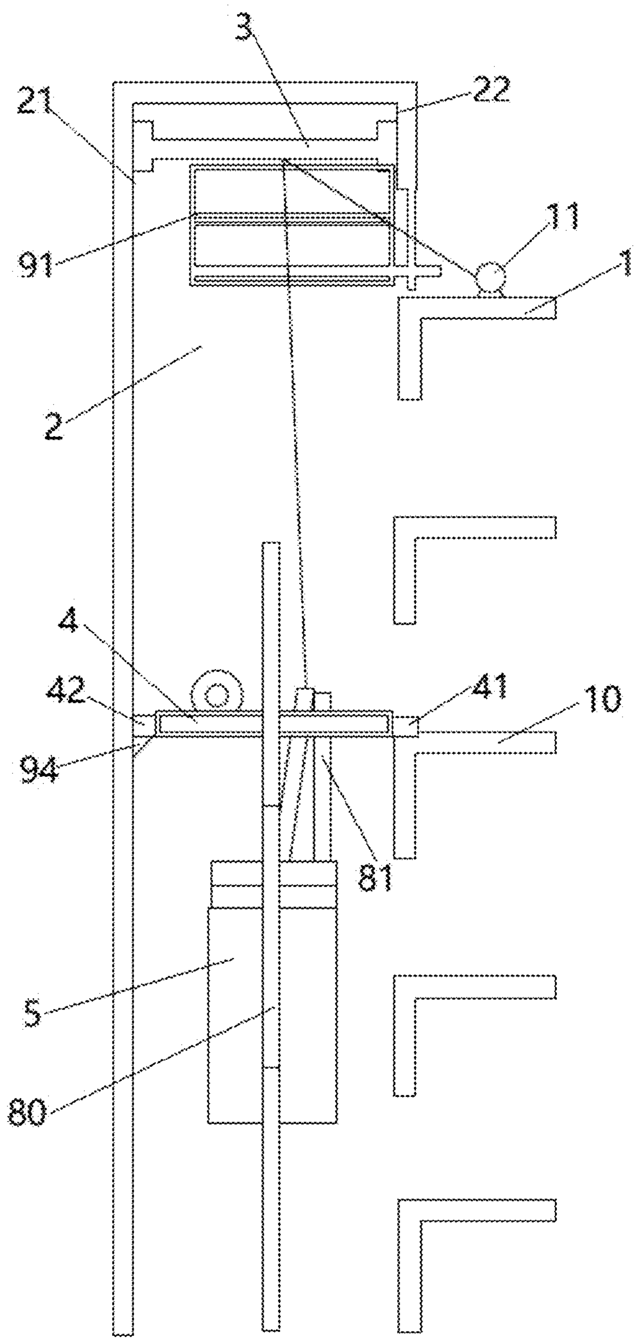
FIG. 5 shows a schematic diagram of installing car guide rails in a shaft.
Figure 6:
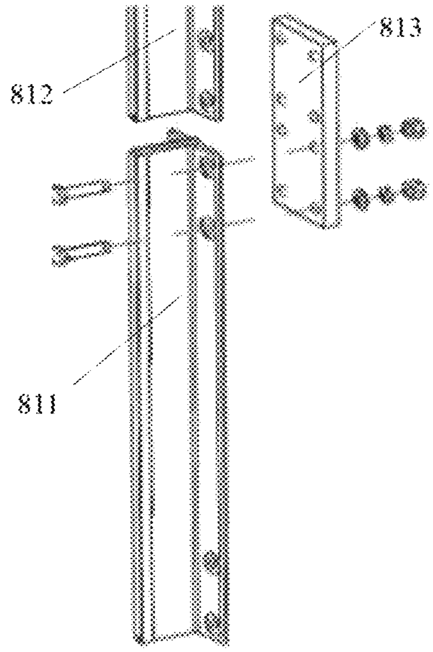
FIG. 6 shows a schematic diagram of pre-assembled exemplary car guide rails.

As shown in FIGS. 5 and 6, in some embodiments, after the top crossbeam 3 is installed in place, car guide rails 81 can be lifted by the winch 11 and the top crossbeam 3. For a plurality of car guide rails 81, a second car guide rail can be connected to a first car guide rail after the first car guide rail is lifted to an appropriate height, and more car guide rails can be connected into a series in this manner. Then, after the series of car guide rails are lifted, the lowest car guide rail can be connected to an originally installed guide rail 80. As shown in the figure, the installed car guide rail 80 only reaches the current floor 10. In order for the car 5 to reach a higher floor, it is necessary to install car guide rails on the two side walls of the shaft. Car guide rails are lifted one by one and connected into a series, where the connection means is shown in FIG. 6. Multiple car guide rails 811, 812 are connected using connecting plates 813. A plurality of car guide rails can be placed on the top of the car, as shown in FIG. 5, so as to facilitate subsequent serial connection and lifting. The car guide rails that are lifted to a predetermined height can then be connected to the original guide rails and installed on the sidewalls of the shaft. In alternative embodiments, car guide rails can be installed by other suitable means, either installed during the construction of the shaft or installed as the elevator rises.

Figure 8:
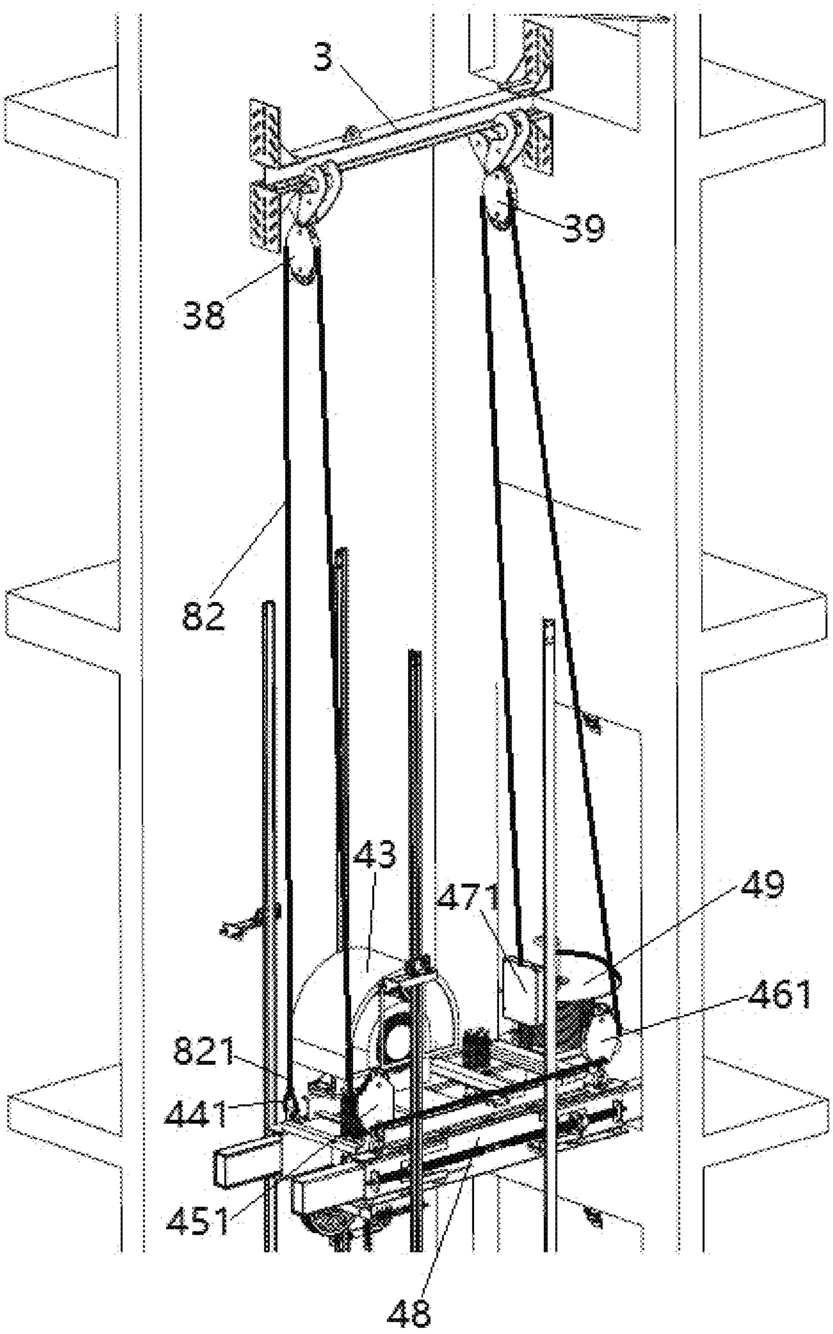
FIG. 8 shows a schematic diagram of the connection means between an exemplary host platform and a top crossbeam.
Figure 9:
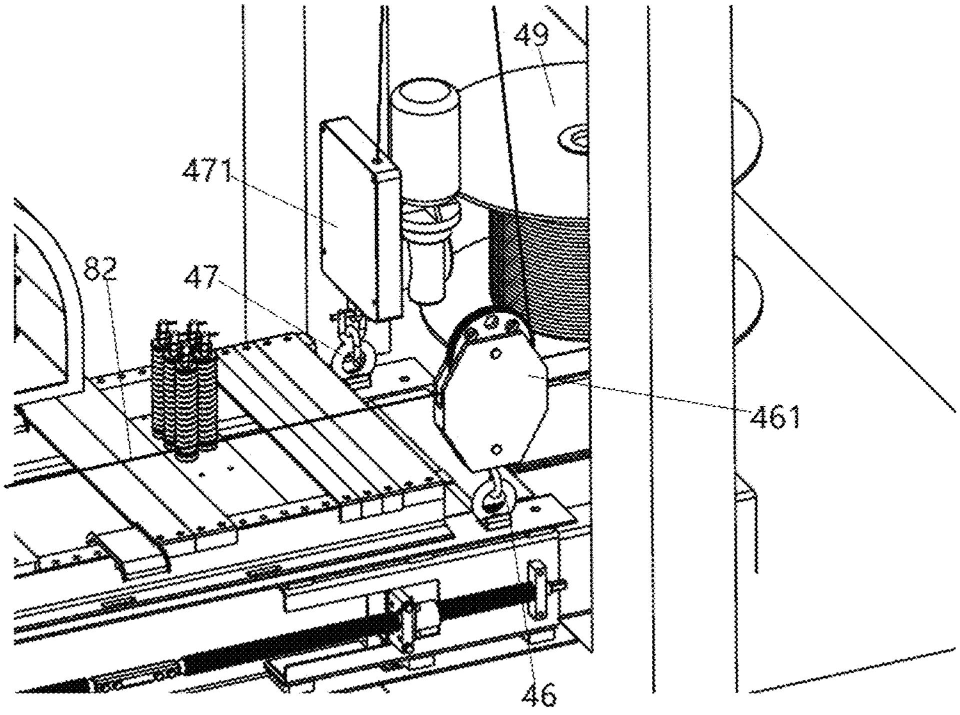
FIG. 9 shows an enlarged view at the rope climber in FIG. 8.

How to connect the host platform of the construction lifting device to the top crossbeam by a drive device will be described with continued reference to FIGS. 7 to 9. In the embodiment, the step of connecting the host platform 4 to the top crossbeam 3 by a drive device include: connecting the host platform to the top crossbeam using fixed pulleys and a climbing rope, and connecting a rope climber to the host platform and threading the climbing rope through the rope climber. It should be appreciated that, in the illustrated embodiment, fixed pulleys, climbing rope, and rope climber are used to form a drive device. In alternative embodiments, the drive device can choose any suitable structures.

Figure 7:
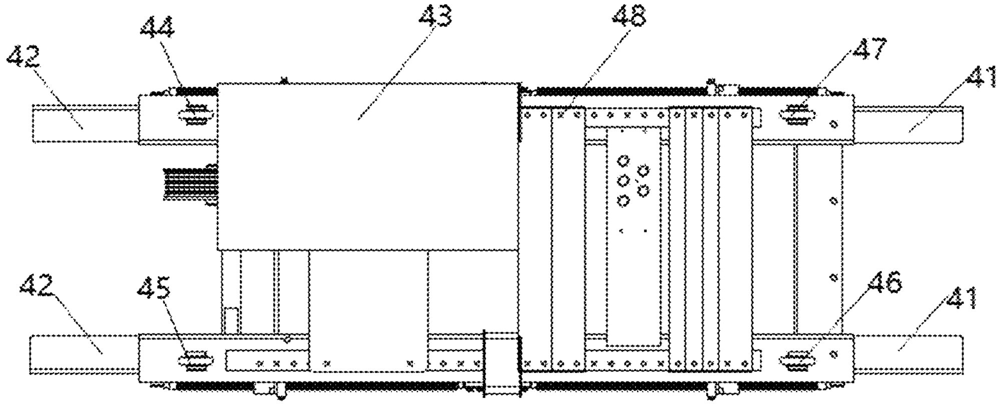
FIG. 7 shows a top view of an exemplary host platform.

As shown in FIG. 7, the host platform 4 includes a main body 48, on which a traction machine 43 and a plurality of installation positions 44, 45, 46, 47 are provided. In some embodiments, the plurality of installation positions 44, 45, 46, 47 specifically include a front first position 47, a front second position 46, a rear first position 45, and a rear second position 44 of the host platform. The front first position 47, the front second position 46, the rear first position 45, and the rear second position 44 can be located at four corners of the host platform and form the four vertexes of a rectangle. In some embodiments, each installation position may be provided with a hanging ring. In addition, two front legs 41 are provided at the front of the main body 48, while two rear legs 42 are provided at the rear of the main body 48. The front legs 41 and rear legs 42 together support the host platform 4. The plurality of installation positions can be used to connect rope hooks, fixed pulleys, or rope climbers. In addition, several fixed pulleys are also arranged on the pulley guide rails of the top crossbeam 3. A rope climber 471 is connected to the host platform 4, while a climbing rope 82 passes through the rope climber 471, and the climbing rope 82 further passes through the top crossbeam 3 and the fixed pulley on the host platform 4 in a certain order to lift the host platform 4 through the rope climber.

More specifically, in the illustrated embodiment, one end of the climbing rope is wound onto a climbing rope spool 49, and then passes through a rope climber 471 connected to the front first position 47 of the host platform, extending upwards to wrap around a second crossbeam fixed pulley 39 on the top crossbeam, extending downwards to wrap around a second platform fixed pulley 461 connected to the front second position 46 of the host platform, extending horizontally to wrap around a first platform fixed pulley 451 connected to the rear second position 45 of the host platform, extending upwards to wrap around a first crossbeam fixed pulley 38 on the top crossbeam, and finally extending downwards to fix to the host platform at the rear first position 44 through a rope hook 441. As shown in the figure, the first platform fixed pulley 451, the second platform fixed pulley 461, and the rope climber 471 are respectively connected to the hanging rings at installation positions 44, 45, 46, 47 on the host platform through hooks. In some embodiments, during operation, the first crossbeam fixed pulley 38 and the second crossbeam fixed pulley 39 are in a first orientation, and the first platform fixed pulley 451 and the second platform fixed pulley 461 are in a second orientation. In some embodiments, the second orientation is the forward-backward direction (perpendicular to the front and rear walls), and the first orientation is perpendicular to the second orientation. In alternative embodiments, the fixed pulleys and climbing rope can be arranged in other ways to connect the top crossbeam 3 and the host platform 4.

Figure 10:
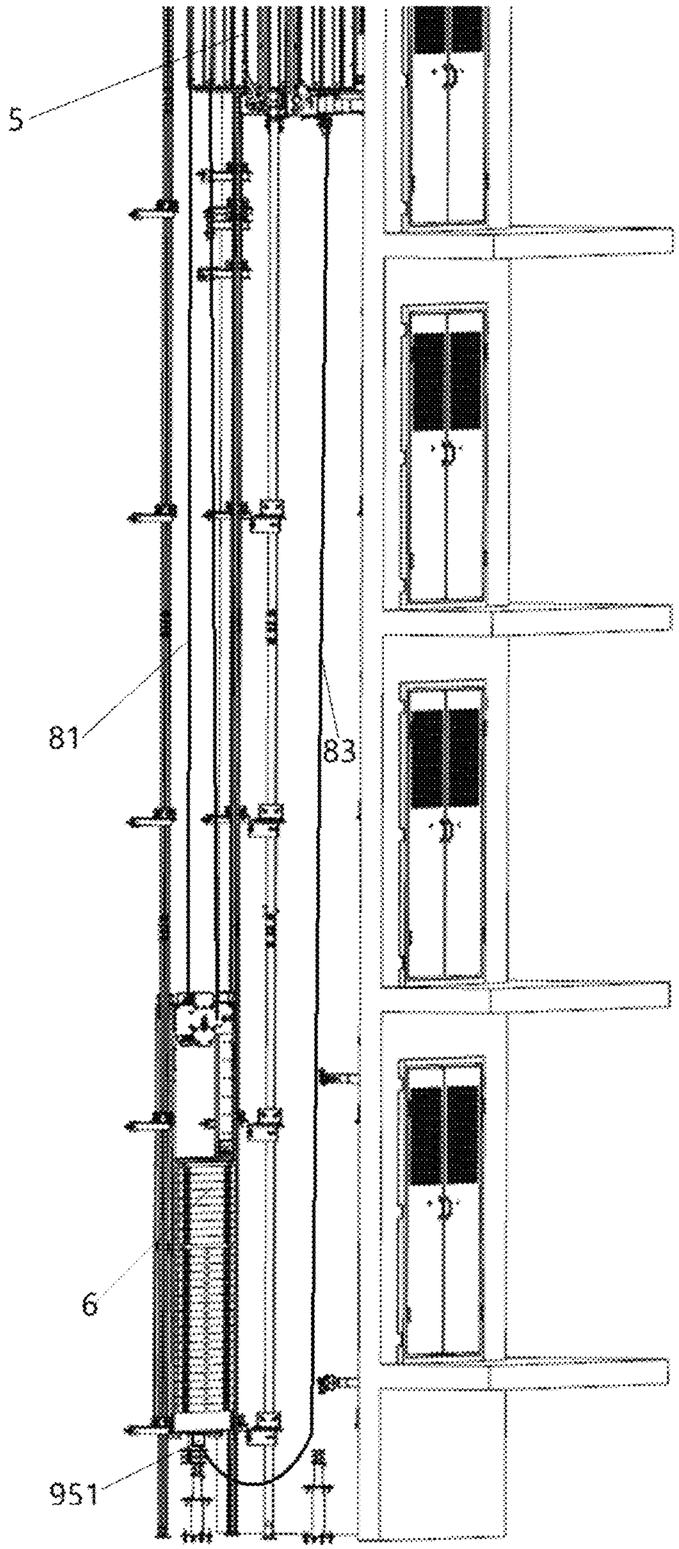
FIG. 10 shows the compensation chain between the counterweight and the car.
Figure 11:
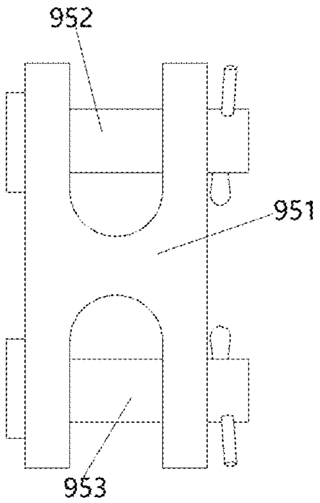
FIG. 11 shows an exemplary compensation chain quick release buckle.

After the above connection step, several preparation steps can be executed, where the order of these preparation steps and the order of the above steps can be interchanged when there is no conflict. Firstly, the car of the construction lifting device rises close to the host platform, such as closest to the highest position of the host platform. At this point, as shown in FIG. 10, the counterweight 6 is lowered to the bottom of the shaft. In some embodiments, a compensation chain 83 is arranged between the bottom of the counterweight 6 and that of the car 5, where the compensation chain 83 is used to compensate for weight changes caused by changes in the length of the driving rope 81 at the top of the counterweight 6 and the car 5. In some embodiments, a compensation chain quick release buckle 951 is installed at the bottom of the counterweight. As shown in FIG. 11, in some embodiments, the compensation chain quick release buckle 951 can have a main body and detachable pins 952, 953 at both ends of the main body. Therefore, after the car rises close to the host platform, the length of the compensation chain 83 is extended using the quick release buckle 951 at the bottom of the shaft. That is, the length of the compensation chain that needs to be extended is added through the quick release buckle 951, so that during the subsequent leaping process of the host platform and the car, the counterweight 6 is kept at the bottom of the shaft without being lifted, and the supplemented compensation chain can compensate for the weight change of the driving rope 81 caused by car movement during the subsequent operation of the lifting device.

Figure 12:
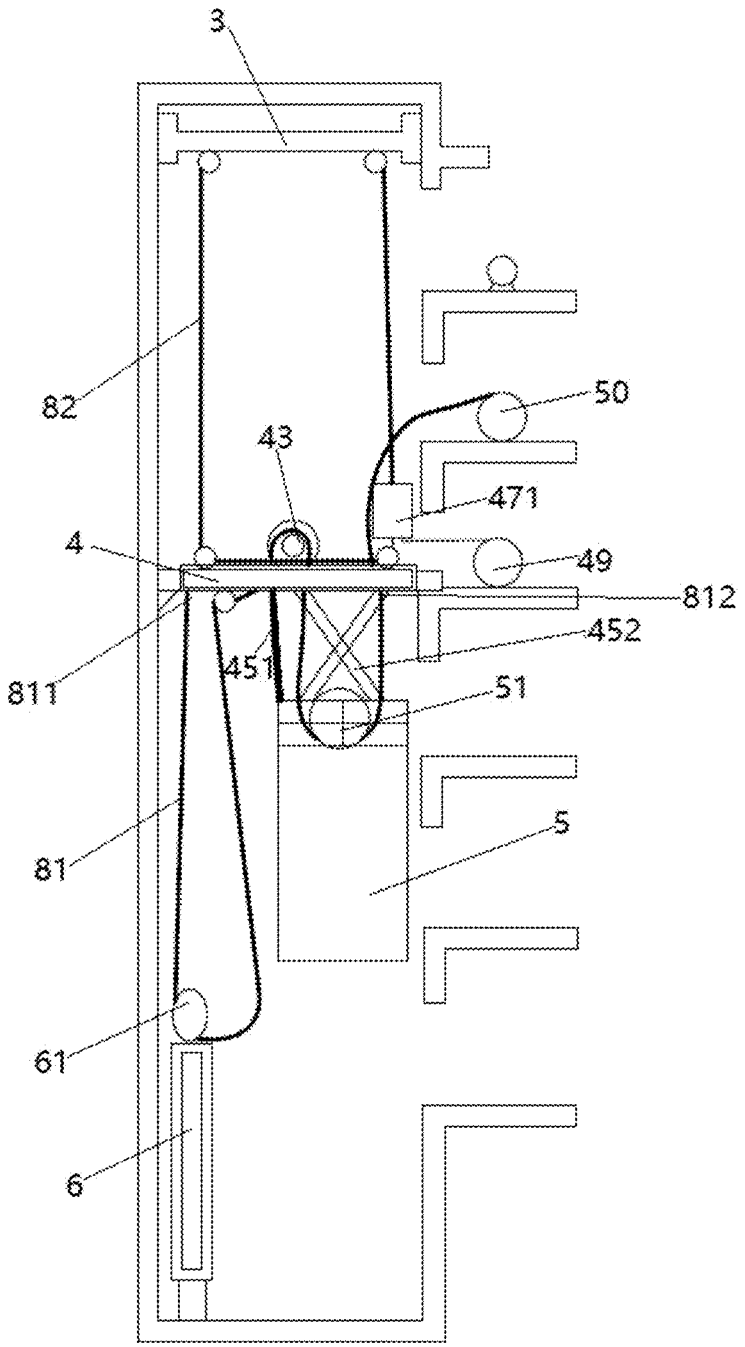
FIG. 12 shows a schematic diagram of an exemplary host platform connected to a car.
Figure 13:
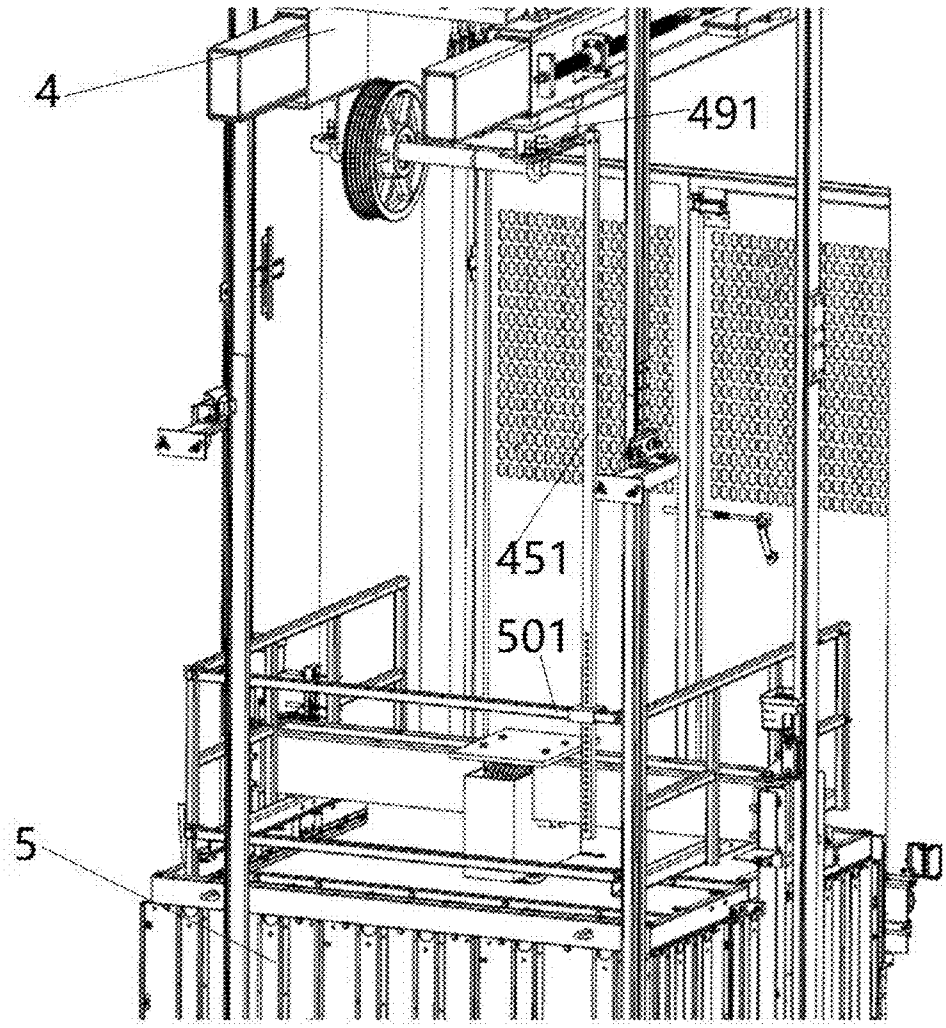
FIG. 13 shows a schematic diagram of the connection between the host platform and the car using connecting rods.

As shown in FIGS. 12 and 13, when the car of the construction lifting device rises close to the host platform, such as the highest position closest to the host platform, the car 5 and the host platform 4 can be fixedly connected, for example, connected through connecting pieces, before, after, or at the time of performing the step of extending the compensation chain as mentioned above. In some embodiments, the connecting pieces may include a rigid connecting piece 451, which is made of, for example, a rigid material, such as a metal rod, to provide a rigid connection between the car 5 and the host platform 4. For example, as shown in FIG. 13, the upper end of the metal rod is connected to a steel beam 491 at the bottom of the host platform 4, and the lower end of the metal rod is connected to the car roof guard rail 501, thus connecting the host platform and the car as a whole that is relatively stable, which can reduce or eliminate the vibrating of the car 5 relative to the host platform 4 during the leaping process. The rigid connecting piece 451 includes, for example, a plurality of rigid connecting rods connected between the host platform 4 and the car 5. In some embodiments, a flexible rope 452 can also be used to connect the car 5 and the host platform 4. The flexible rope 452 not only mainly plays a protective role but also partially plays the role of mitigating vibration, especially to prevent the car 5 from accidentally falling due to the failure of the rigid connecting piece 451 during the leaping process. In the illustrated embodiment, the flexible rope 452 is arranged in an X-shaped shape, and in alternative embodiments, the flexible rope can be connected by other suitable means.

Figure 14A:
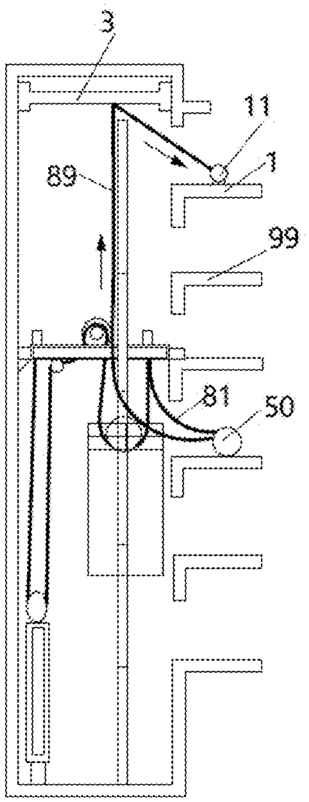
FIGS. 14*a*-14*c* show schematic diagrams of lifting the driving rope spool.
Figure 14B:
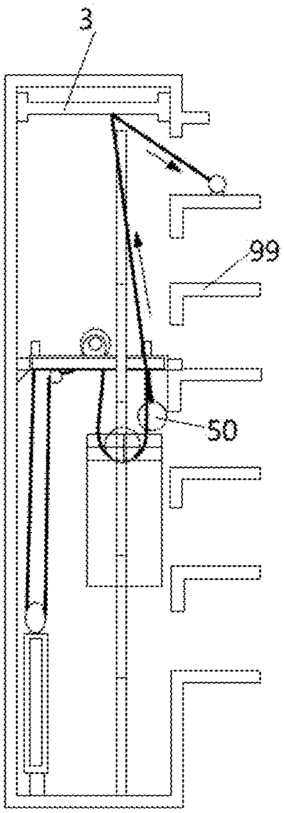
Figure 14C:
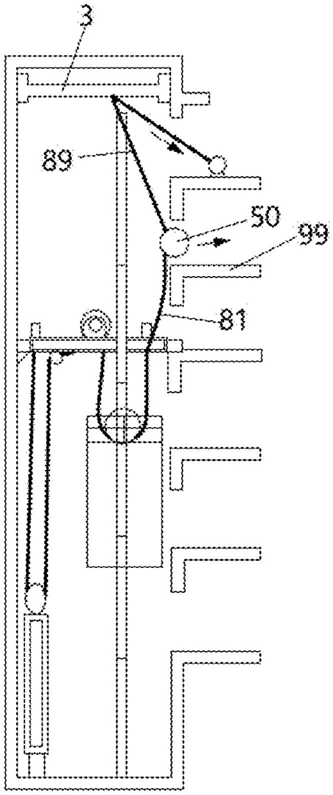

With continued reference to FIGS. 14*a-c*, before, after, between, or at the time of any one of the above steps, the driving rope spool 50 can be lifted and arranged outside the hall door of the lower floor 99 next to the target floor through the winch 11 and the top crossbeam 3 on the target floor 1. Specifically, the step include using a sling rope 89 to connect the driving rope spool 50 to the winch 11 through the fixed pulley on the top crossbeam 3, lifting the driving rope spool 50 through the winch 11, and reinstalling the driving rope spool 50 outside the hall door of the lower floor 99 next to the target floor. Similarly, the same method can also be used to lift other related equipment, such as control cabinet, to the hall door on the lower floor 99 next to the target floor, in preparation for lifting the host platform.

Figure 15A:
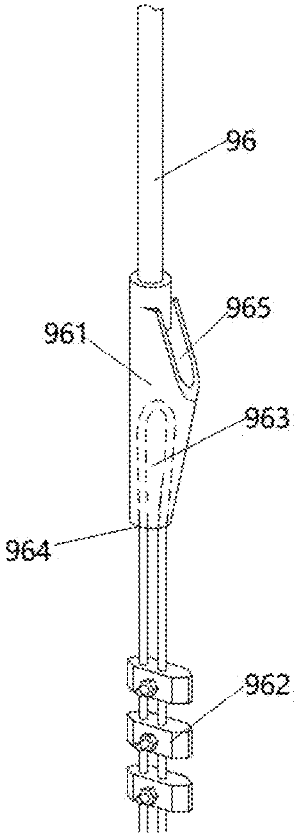
FIGS. 15*a* to 15*c* show schematic diagrams of adjusting the second rope head component.
Figure 15B:
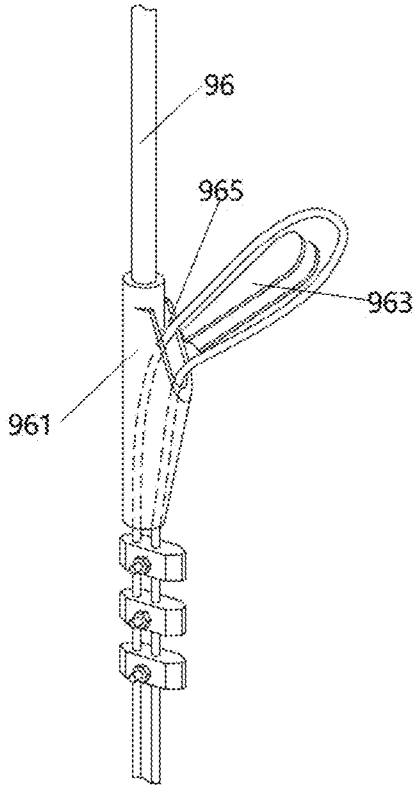
Figure 15C:
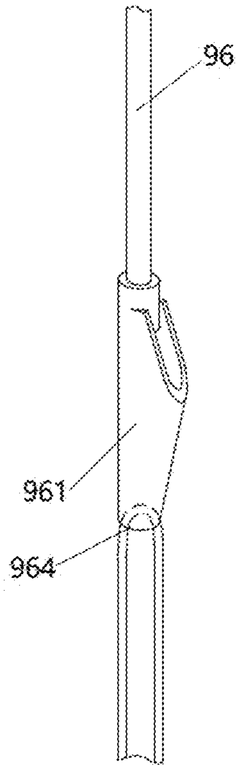
Figure 16:
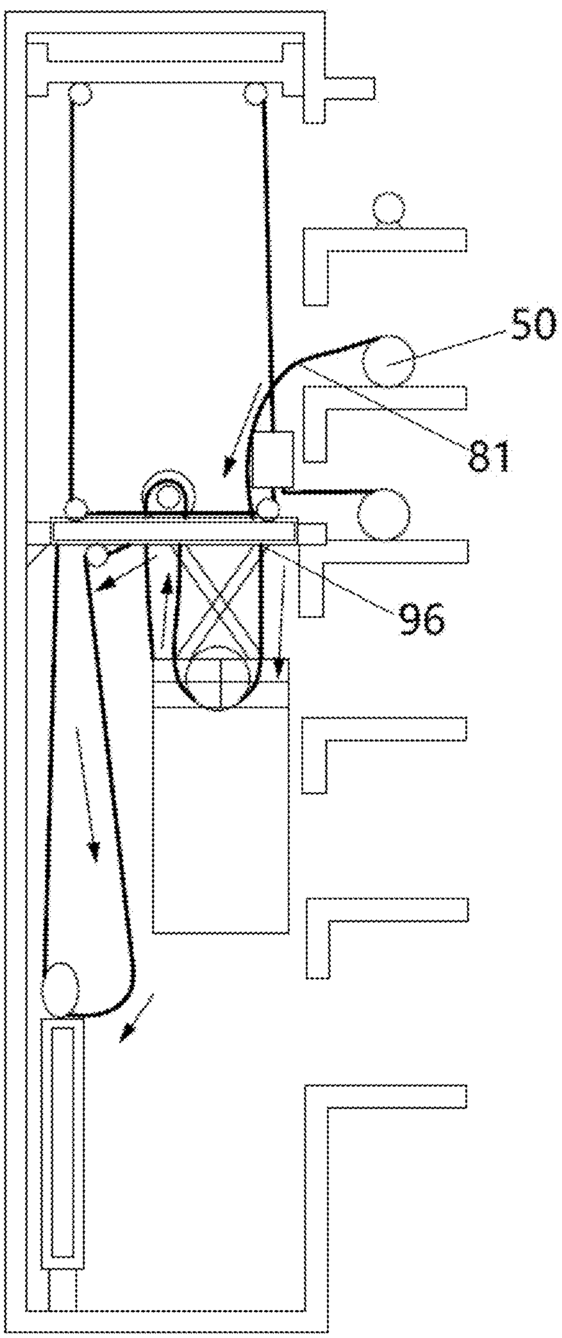
FIG. 16 shows a schematic diagram of releasing the driving rope.

With continued reference to FIGS. 12, 15, and 16, the car 5, the counterweight 6, and the host platform 4 are connected by a driving rope 81. The method according to the embodiments of the present invention also includes releasing sufficient driving rope 81 before activating the rope climber, so that when the rope climber is activated, the counterweight 6 is kept at the bottom of the shaft. The driving rope is tightened after climbing is completed. In some embodiments, at least one end of the driving rope is connected to the host platform 4 through an adjustable rope head component, and the driving rope is released using the adjustable rope head component.

More specifically, in the exemplary driving rope arrangement shown in FIG. 12, the fixed end of the driving rope is connected to the host platform 4 through a first rope head component 811, where the first rope head component 811 is a fixed rope head component (non-adjustable), so that the fixed end of the driving rope is connected to the host platform. Starting from the fixed end at 811, the driving rope is sequentially wound around a counterweight fixed pulley 61 on the top of the counterweight, a traction machine 43 on the host platform, a car fixed pulley 51 on the top of the car, and a second rope head component 812 on the host platform, and is then wound on the driving rope spool 50. The second rope head component 812 is an adjustable rope head component, enabling the driving rope 81 to be adjustable through the second rope head component 812, so the step of releasing and tightening the driving rope are achieved through the second rope head component 812.

With continued reference to FIGS. 15*a-c*, a specific embodiment of a second rope head component is described. The second rope head component includes a rope head body 961, which is connected to the host platform through a connecting rod 96. The rope head body 961 includes an outer wall, an internal cavity inside the outer wall, and a first port 965 and a second port 964 at both ends of the internal cavity. The size of the internal cavity decreases gradually from the first port 965 to the second port 964. The size of the second port 964 is constructed to allow a double stranded driving rope to be taken out from it. A wedge block 963 with a matching shape can be placed into the internal cavity from the second port 964. The driving rope is inserted into the internal cavity from the second port 964 and then drawn out from the first port 965. After a wedge block 963 is added, the driving rope is then reinserted into the internal cavity from the first port 965. This allows the driving rope to be clamped between the wedge block 963 and the outer wall of the rope head body 961. Additionally, a wire clamp 962 can be arranged outside the second port 964 for reinforcement. If adjustment is required, the wedge block 963 can be taken out from the first port 965 as shown in FIG. 15*b*, and then the driving rope can be taken out from the second port 964 as shown in FIG. 15*c*. At this point, the length of the driving rope can be adjusted by releasing the driving rope on the driving rope spool 50. In some embodiments, the method includes releasing sufficient driving rope, where the step of releasing sufficient driving rope include: disassembling the wire clamps and the wedge block to release the driving rope wound on the driving rope spool 50, where the driving rope is released as shown by the arrows in FIG. 16; and after enough driving rope is released, the double stranded rope is reinstalled into the rope head body 961 from the second port 964, the wedge block 963 is then reinserted into the rope, and the wire clamp 962 is arranged to secure the driving rope at the second rope head component. In some embodiments, the length of the driving rope released is greater than twice the lifting height.

Figure 17:
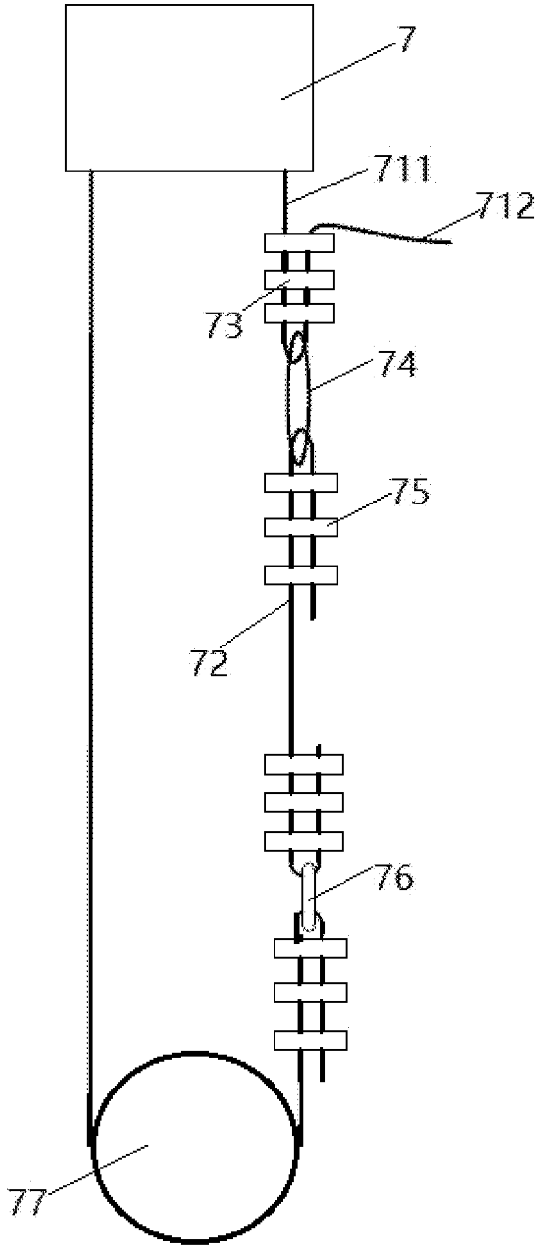
FIG. 17 shows a schematic diagram of the structure of an exemplary speed governor.

In addition, in some embodiments, the construction lifting device also includes a speed governor, which can be installed on the car guide rails of the current floor. As shown in FIG. 17, a speed governor 7 and a safety gear lifting mechanism 76 are connected through a speed governor rope, which includes a first section 711 connected to the speed governor and a second section 72 connected to the safety gear lifting mechanism 76. The first and second sections are each wound into a U-shaped through wire clamps 73, 75 and connected through a ring buckle 74. The first section includes a redundant segment 712 (also known as the free end) retained through the wire clamp 73, where this redundant segment 712 can be placed on the top of the car. The car of the construction lifting device is lifted close to the host platform, such as closest to the highest position of the host platform. Before, after, between, or at the time of performing any of the above steps, the leaping method also includes: disassembling the wire clamp 73 to release the redundant segment to extend the speed governor rope and reinstalling the wire clamp 73, and then lifting the speed governor to the target floor and installing it on the car guide rails above the target floor, where the safety gear lifting mechanism 76 and the tensioning device at the bottom of the speed governor rope do not need to be moved.

Figure 18:
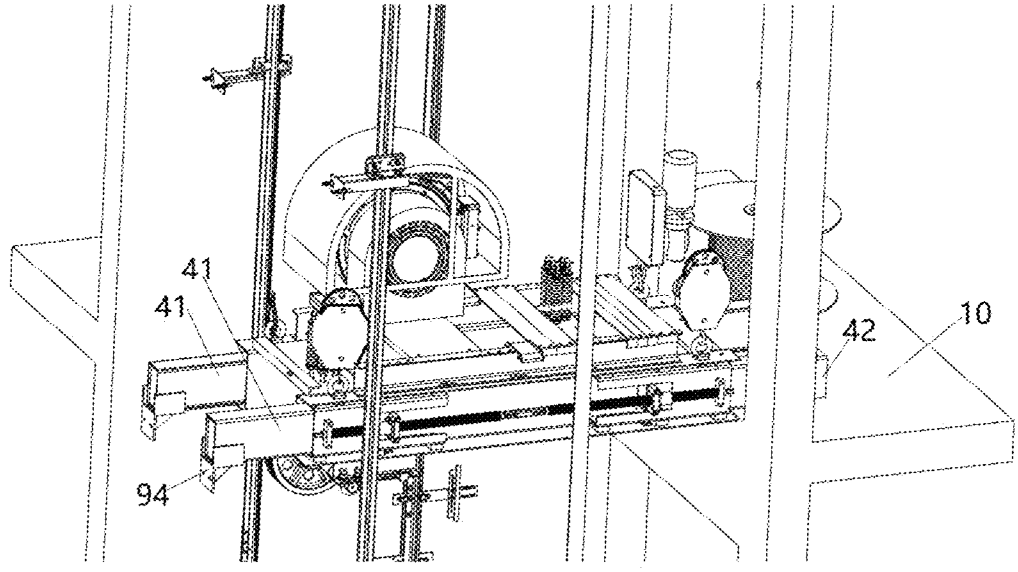
FIG. 18 shows a schematic diagram of the host platform connected to the current floor.
Figure 19A:
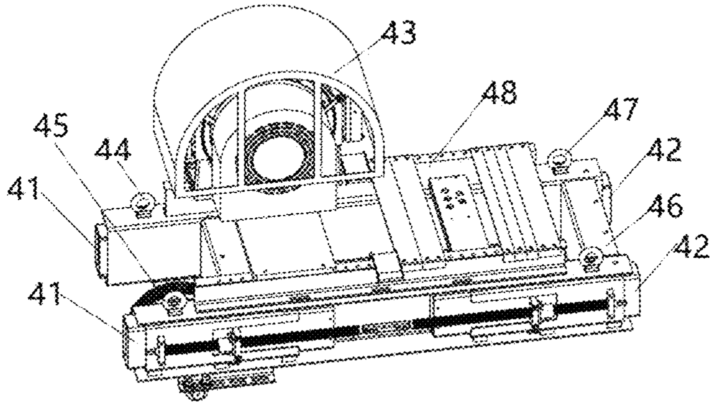
FIGS. 19*a* and 19*b* respectively show schematic diagrams of the telescopic legs of the host platform in their retracted and extended states.
Figure 19B:
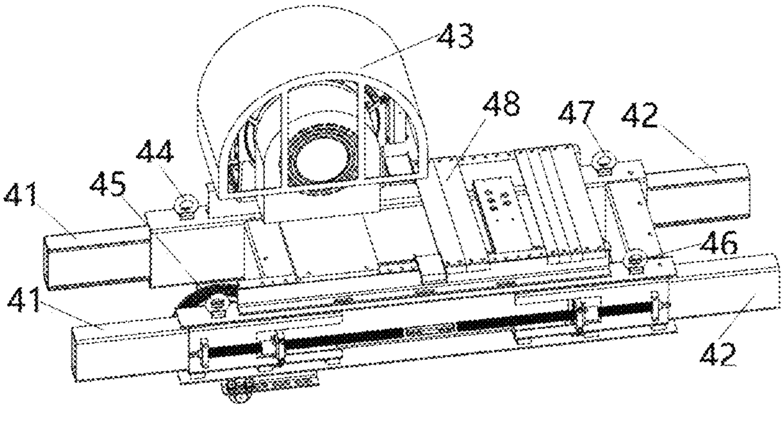
Figure 20:
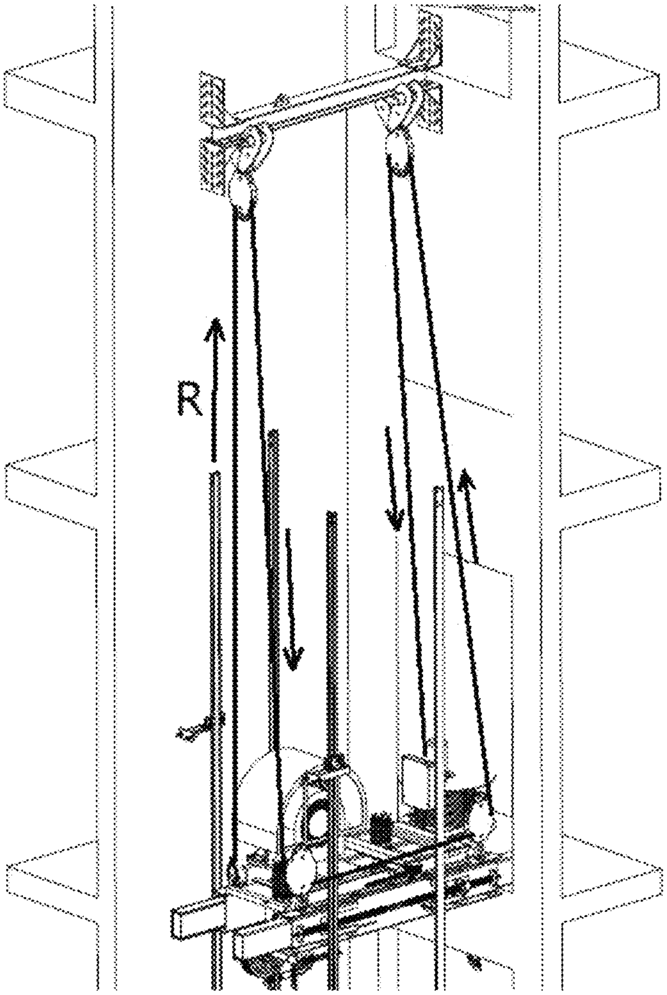
FIG. 20 shows a schematic diagram of the running directions of the climbing rope after the rope climber is activated.

Referring to FIG. 18, the host platform 4 is supported on the current floor through front and rear legs that are telescopic in the front and rear directions. Before lifting the host platform 4, as shown in FIGS. 19*a* and 19*b*, the connection between the host platform 4 and the current floor can be removed, for example, by changing the respective legs from an extended position to a retracted position. And then, the rope climber is activated, and the climbing rope between the top crossbeam 3 and the host platform 4 moves in the directions indicated by the arrows as shown in FIG. 20, thus shortening the climbing rope between the two and lifting the host platform 4 until the host platform 4 rises to the target floor. Subsequently, the host platform is connected to the target floor. This step may include, for example, extending the telescopic legs, so that the front legs at the front of the host platform are supported by the floor outside the hall door of the target floor, and the rear legs at the rear of the host platform are supported by the horn brackets 94 pre-installed on the rear wall (see FIG. 18). Thereafter, the driving rope is adjusted and tightened using the second rope head component, the connecting pieces between the car and the top platform (including rigid and flexible connections) are removed, and after performing adaptive reset, debugging, testing, and trial operation on other components, the car can operate normally within a greater height range, as shown in FIG. 1. It should be appreciated that the above leaping process can be carried out multiple times during the construction of the building.

According to another aspect, a construction lifting device is provided, which includes: a host platform 4 with a traction machine 43 and a plurality of installation positions 45, 46, 47, 48 provided thereon, a car 5, and a counterweight 6, where the car 5 and the counterweight 6 are connected to the traction machine 43 on the host platform 4 through a driving rope 81, and a compensation chain 82 is connected between the bottom of the car 5 and that of the counterweight 6; wherein, hanging rings are provided at the plurality of installation positions 45, 46, 47, 48 on the host platform for connecting to rope hooks, fixed pulleys, or rope climber. In some embodiments, the host platform 4 has a front portion close to the front wall and a rear portion close to the rear wall, and the front and rear portions of the host platform each includes front legs 41 and rear legs 42 that are telescopic in the front and rear directions.

According to yet another aspect, a construction lifting device is provided, which includes: a host platform 4 with a traction machine 43 and a plurality of installation positions 45, 46, 47, 48 provided thereon, a car 5, and a counterweight 6, where the car 5 and the counterweight 6 are connected to the traction machine 43 on the host platform 4 through a driving rope 81, and a compensation chain 82 is connected between the bottom of the car 5 and that of the counterweight 6; wherein, a compensation chain quick release buckle is arranged at the bottom of the counterweight.

According to still another aspect, a construction lifting device is provided, which includes: a host platform 4, with a traction machine 43 and a plurality of installation positions 45, 46, 47, 48 provided thereon, a car 5, and a counterweight 6, where the car 5 and the counterweight 6 are connected to the traction machine 43 on the host platform 4 through a driving rope 81, and a compensation chain 82 is connected between the bottom of the car 5 and that of the counterweight 6; wherein, at least one end of the driving rope is connected to the host platform through an adjustable rope head component. In some embodiments, the fixed end of the driving rope is connected to the host platform through a first rope head component, and the driving rope, starting from the fixed end, is sequentially wound around a counterweight fixed pulley at the top of the counterweight, the traction machine, a car fixed pulley at the top of the car, and a second rope head component on the host platform before being wound on the driving rope spool, where the second rope head component is an adjustable rope head component, thus enabling the driving rope to be adjustable through the second rope head component. The second rope head component can be one as described above in conjunction with FIGS. 15*a-c*.

According to a further aspect, a construction lifting device is provided, which includes: a host platform 4, with a traction machine 43 and a plurality of installation positions 45, 46, 47, 48 provided thereon, a car 5, and a counterweight 6, where the car 5 and the counterweight 6 are connected to the traction machine 43 on the host platform 4 through a driving rope 81, and a compensation chain 82 is connected between the bottom of the car 5 and that of the counterweight 6; wherein, the construction lifting device includes a speed governor installed on the car guide rails and a safety gear connected to the car. The speed governor is connected to the safety gear through a speed governor rope, wherein the speed governor rope includes a first section connected to the speed governor and a second section connected to the safety gear. The first and second sections are each wound into a U-shaped shape through a wire clamp and connected through a ring buckle, wherein, the first section includes a redundant segment retained through the wire clamp.

The specific embodiments described above in the present application are merely intended to describe the principles of the present application more clearly, wherein various components are clearly shown or described to facilitate the understanding of the principles of the present invention. Those skilled in the art may, without departing from the scope of the present application, make various modifications or changes to the present application. Therefore, it should be understood that these modifications or changes should be included within the scope of patent protection of the present application.

What is claimed is:

1. A leaping method for a construction lifting device, the method comprising:

- erecting a top crossbeam above a target floor in a shaft;
- connecting a host platform of the construction lifting device to the top crossbeam by a drive device;
- raising a car of the construction lifting device close to the host platform and fixedly connecting the car to the host platform; and
- activating the drive device to lift the host platform to the target floor;
- wherein the leaping method further includes: before erecting the top crossbeam, lifting the top crossbeam to an installation position using a winch and a rope.

2. The leaping method according to claim 1, wherein the connecting the host platform to the top crossbeam by a drive device includes: connecting the host platform to the top crossbeam using fixed pulleys and a climbing rope, and connecting a rope climber to the host platform and threading the climbing rope through the rope climber.

3. The leaping method according to claim 2, wherein the leaping method further includes: removing a connection between the host platform and a current floor before activating the drive device, and connecting the host platform to the target floor after the host platform is lifted to the target floor.

4. A leaping method for a construction lifting device, the method comprising:

- erecting a top crossbeam above a target floor in a shaft;
- connecting a host platform of the construction lifting device to the top crossbeam by a drive device;
- raising a car of the construction lifting device close to the host platform and fixedly connecting the car to the host platform; and
- activating the drive device to lift the host platform to the target floor;
- wherein fixedly connecting the car to the host platform includes:
- connecting the car to the host platform using a plurality of rigid connecting rods; and
- connecting the car to the host platform using flexible ropes.

5. The leaping method according to claim 1, wherein the leaping method further includes: after erecting the top crossbeam, lifting car guide rails through the winch and the top crossbeam, and installing the car guide rails to extend the car guide rails on side walls on both sides of the shaft to the target floor.

6. The leaping method according to claim 1, wherein the erecting a top crossbeam above the target floor in the shaft includes: horizontally arranging the top crossbeam across the shaft between front and rear walls of the shaft.

7. The leaping method according to claim 1, wherein the leaping method further includes: extending a compensation chain connected between bottom of a counterweight and that of the car and extending a driving rope connected between the host platform, the counterweight, and the car, before activating the drive device, so that the counterweight remains at the bottom of the shaft during the leaping process of the host platform.

8. The leaping method according to claim 7, wherein the method includes: arranging a compensation chain quick release buckle at the bottom of the counterweight; and extending a length of the compensation chain through the quick release buckle at the bottom of the shaft after the car has risen close to the host platform.

9. The leaping method according to claim 7, wherein the method also includes: lifting a driving rope spool through the winch and the top crossbeam and arranging it outside a door opening on a lower floor next to the target floor, before extending the driving rope.

10. The leaping method according to claim 7, wherein the host platform is provided with a traction machine, and at least one end of the driving rope is connected to the host platform through an adjustable rope head component, where extending the driving rope includes: releasing the driving rope through the adjustable rope head component.

11. The leaping method according to claim 10, wherein a fixed end of the driving rope is connected to the host platform through a first rope head component, and the driving rope, starting from the fixed end, is sequentially wound around a counterweight fixed pulley at the top of the counterweight, the traction machine on the host platform, a car fixed pulley at the top of the car, and a second rope head component on the host platform before being wound onto a driving rope spool, where the second rope head component is an adjustable rope head component.

12. The leaping method according to claim 11, wherein the second rope head component includes: a rope head body connected to the host platform and comprising an outer wall, an internal cavity defined by the outer wall, a first port and a second port at both ends of the internal cavity, where a size of the internal cavity decreases gradually from the first port to the second port, and a wedge block having a shape that matches the internal cavity and capable of being inserted into the internal cavity from the first port, causing the driving rope to be clamped between the wedge block and the outer wall of the rope head body, wherein, extending the driving rope includes: removing the wedge block, taking out the driving rope from the second rope head component, and releasing the driving rope from the driving rope spool.

13. The leaping method according to claim 2, wherein the leaping method further includes arranging a climbing rope as follows: winding a free end of the climbing rope onto a climbing rope spool, then passing through a rope climber connected to a front first position of the host platform, extending upwards to wrap around a second crossbeam fixed pulley on the top crossbeam, extending downwards to wrap around a second platform fixed pulley connected to a front second position of the host platform, extending horizontally to wrap around a first platform fixed pulley connected to a rear second position of the host platform, extending upwards to wrap around a first crossbeam fixed pulley on the top crossbeam, and finally extending downwards to fix to the host platform through a rope hook at a rear first position.

14. A leaping method for a construction lifting device, the method comprising:

erecting a top crossbeam above a target floor in a shaft;

connecting a host platform of the construction lifting device to the top crossbeam by a drive device;

raising a car of the construction lifting device close to the host platform and fixedly connecting the car to the host platform; and activating the drive device to lift the host platform to the target floor;

wherein the leaping method further includes: extending a speed governor rope between a speed governor and a safety gear lifting mechanism, and lifting and installing the speed governor on car guide rails of the target floor.

15. The leaping method according to claim 14, wherein the speed governor is connected with the safety gear lifting mechanism that is connected to the car through a speed governor rope, wherein the speed governor rope includes a first section connected to the speed governor and a second section connected to the safety gear lifting mechanism, where the first section and the second section are each wound into a U-shaped shape through a wire clamp and connected through a ring buckle, and the first section includes a redundant segment retained through the wire clamp, and the leaping method further includes: extending the speed governor rope by adjusting a position of the wire clamp to release the redundant segment.

16. The leaping method according to claim 3, wherein the removing a connection between the host platform and the current floor includes retracting front and rear legs of the host platform, and the connecting the host platform to the target floor includes unfolding the front and rear legs.

17. The leaping method according to claim 1 wherein the winch is arranged on the target floor, a transition pulley is installed on a shaft wall, and the rope connects the winch and the transition pulley.

* * * * *